United States Patent [19]

Wazaki et al.

[11] Patent Number: 5,283,742
[45] Date of Patent: Feb. 1, 1994

[54] EXCESS SLIP CONTROL DEVICE FOR DRIVING WHEEL

[75] Inventors: Yoshio Wazaki; Tetsuya Oono, both of Wako, Japan

[73] Assignee: Honda Giken Kogyo Kabushiki Kaisha, Tokyo, Japan

[21] Appl. No.: 983,097

[22] Filed: Nov. 24, 1992

Related U.S. Application Data

[63] Continuation of Ser. No. 794,378, Nov. 15, 1991, abandoned, which is a continuation of Ser. No. 326,835, Mar. 21, 1989, abandoned.

[30] Foreign Application Priority Data

Mar. 23, 1988 [JP] Japan .................................. 63-68701

[51] Int. Cl.$^5$ .............................................. B60K 28/16
[52] U.S. Cl. ........................... 364/426.02; 364/426.03; 180/197; 123/333; 123/481
[58] Field of Search ....................... 364/426.02, 426.03, 364/431.07, 431.09; 180/197; 123/333, 481, 493; 303/100, 102, 103, 106

[56] References Cited

U.S. PATENT DOCUMENTS

| | | | |
|---|---|---|---|
| 4,257,363 | 3/1981 | Zeller | 123/493 |
| 4,259,723 | 3/1981 | Fujisawa et al. | 123/493 |
| 4,721,176 | 1/1988 | Kabasin et al. | 123/333 |
| 4,739,856 | 4/1988 | Inagaki et al. | 364/426.03 |
| 4,850,446 | 7/1989 | Leiber | 364/426.03 |
| 4,856,610 | 8/1989 | Leiber | 364/426.03 |
| 4,860,849 | 8/1989 | Andersson et al. | 180/197 |
| 5,038,883 | 8/1991 | Kushi et al. | 180/197 |
| 5,046,009 | 9/1991 | Abo et al. | 123/333 |
| 5,067,579 | 11/1991 | Kushi et al. | 364/426.03 |
| 5,099,942 | 3/1992 | Kushi et al. | 180/197 |
| 5,168,952 | 12/1992 | Oono et al. | 123/481 |

FOREIGN PATENT DOCUMENTS

| | | |
|---|---|---|
| 0240174 | 7/1987 | European Pat. Off. . |
| 60-107430 | 6/1985 | Japan . |
| 61-283736 | 12/1986 | Japan . |
| 62-67257 | 3/1987 | Japan . |

Primary Examiner—Gary Chin
Attorney, Agent, or Firm—Armstrong, Westerman, Hattori, McLeland & Naughton

[57] ABSTRACT

An excess slip control device for a driving wheel, comprising a driving wheel speed sensor for detecting a driving wheel speed of a vehicle, a slip determining means for determining a slip condition of a driving wheel according to an output from the driving wheel speed sensor, a fuel supply suppressing means for suppressing fuel supply to an engine according to an output from the slip determining means, and a retard control means for controlling an ignition timing to a retard position according to an output from the slip determining means. Thus, the fuel quantity to be supplied to the engine and the ignition timing are controlled according to the slip condition of the driving wheel. Accordingly, an operational shock due to a fluctuation in engine torque may be reduced to thereby improve the drivability, and a control lag may be also eliminated.

6 Claims, 7 Drawing Sheets

EXCESS SLIP CONTROL DEVICE FOR DRIVING WHEEL

The application is a continuation of application Ser. No. 07/794,378 filed Nov. 15, 1991, which is a continuation of application Ser. No. 07/326,835 filed Mar. 21, 1989, now abandoned.

BACKGROUND OF THE INVENTION

The present invention relates to an excess slip control device for a driving wheel, and more particularly to a control device for controlling excess slip of the driving wheel by controlling fuel supply to an engine and controlling an ignition timing.

In a conventional excess slip control device for a driving wheel, a slip condition of the driving wheel is detected according to a driving wheel speed or the like, and when a predetermined slip condition is detected, fuel supply to an engine is suppressed (cut, for example) to reduce an engine output, thus preventing the excess slip of the driving wheel. Such a control device has been proposed by the present applicant in Japanese Patent Application No. 62-145920, for example. In this control device, when a predetermined slip condition is detected, stop of fuel supply to the engine (which will be hereinafter referred to as fuel cut) and reduction of the fuel supply is alternately repeated so as to prevent an operational shock due to rapid decrease in engine torque and improve the drivability.

However, in the above prior art device, when the operational condition is shifted to a fuel cut region that is a region where the predetermined slip condition is detected, or the operational condition is shifted from the fuel cut region, a fuel quantity to be supplied to the engine is largely fluctuated. As a result, a fluctuation in engine torque cannot be sufficiently prevented, and it is yet necessary to improve the suppression of the operational shock. Further, even when it is determined that the fuel cut should be carried out, the fuel cut is not carried out with respect to any cylinder in a compression stroke or an explosion stroke at the timing of determination, resulting in the generation of control lag.

SUMMARY OF THE INVENTION

Accordingly, it is an object of the present invention to provide an excess slip control device for a driving wheel which may reduce the operational shock due to a fluctuation in engine torque and improve the drivability.

It is another object of the present invention to provide an excess slip control device for a driving wheel which may eliminate the control lag.

According to the present invention, there is provided an excess slip control device for a driving wheel, comprising a driving wheel speed sensor for detecting a driving wheel speed of a vehicle, a slip determining means for determining a slip condition of a driving wheel according to an output from said driving wheel speed sensor, a fuel supply suppressing means for suppressing fuel supply to an engine according to an output from said slip determining means, and a retard control means for controlling an ignition timing to a retard position according to an output from said slip determining means.

Other objects and features of the invention will be more fully understood from the following detailed description and appended claims when taken with the accompanying drawings.

DETAILED DESCRIPTION OF THE PREFERRED EMBODIMENT

There will now be described a preferred embodiment of the present invention with reference to the drawings.

Figure 1:
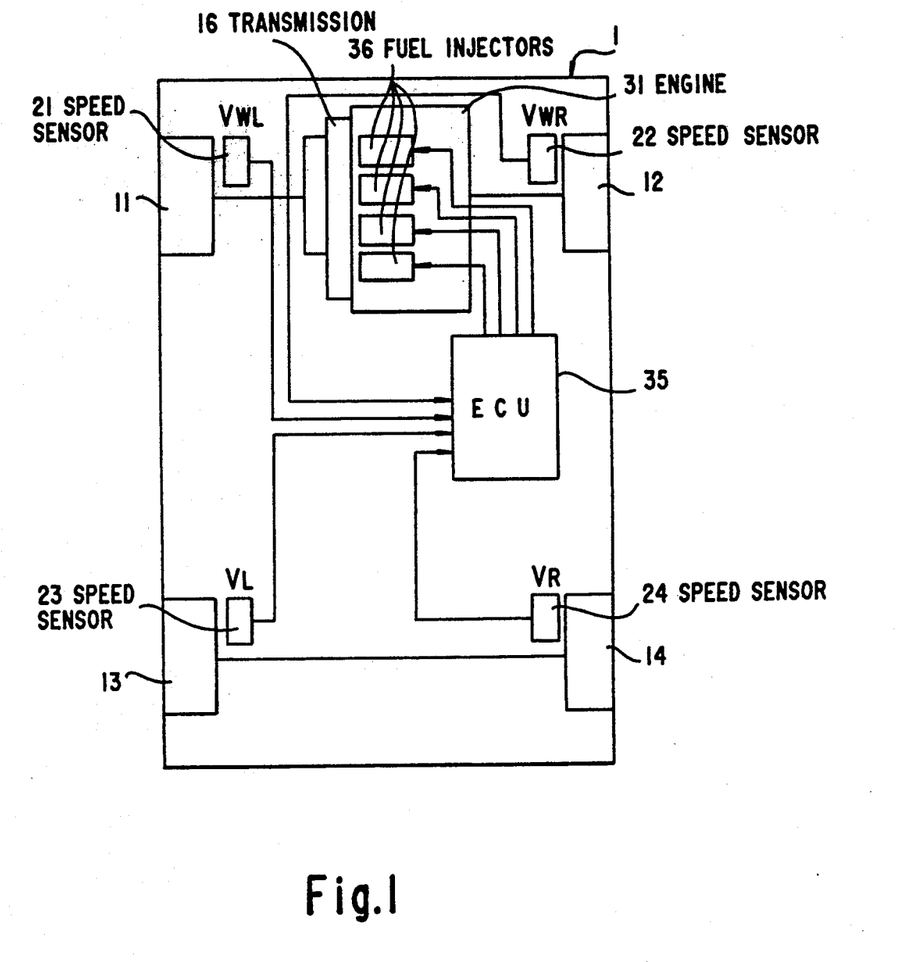
FIG. 1 is a schematic illustration of a vehicle provided with the excess slip control device for the driving wheel according to the present invention.

FIG. 1 shows a vehicle 1 provided with an excess slip control device for a driving wheel according to the present invention. In the preferred embodiment, the vehicle 1 is of a front-wheel driving type such that front wheels 11 and 12 are driving wheels to be driven by an internal combustion engine (which will be hereinafter referred to as an engine) 31 through a transmission 16 and that rear wheels 13 and 14 are driven wheels. As will be apparent from the following description, the present invention is also applicable to a rear-wheel driving type vehicle in the same manner. The driving wheels 11 and 12 are provided with driving wheel speed sensors (which will be hereinafter referred to as $V_W$ sensors) 21 and 22, respectively, while the driven wheels 13 and 14 are also provided with driven wheel speed sensors (which will be hereinafter referred to as V sensors) 23 and 24, respectively. The $V_W$ sensors 21 and 22 detect a left driving wheel speed $V_{WL}$ and a right driving wheel speed $V_{WR}$, respectively, while the V sensors 23 and 24 detect a left driven wheel speed $V_L$ and a right driven wheel speed $V_R$, respectively. These detection signals are input to an electronic control unit (which will be hereinafter referred to as an ECU) 35.

As will be hereinafter described, the ECU 35 determines a slip condition of the driving wheels 11 and 12 according to the driving wheel speeds $V_{WL}$ and $V_{WR}$, the driven wheel speeds $V_L$ and $V_R$, etc. According to the slip condition as determined above, the ECU 35 controls an output of the engine 31 by a fuel supply control device and an ignition timing control device which will be hereinafter described, and thereby controls a torque of the driving wheels 11 and 12, thus controlling the slip condition of the driving wheels 11 and 12.

That is to say, the ECU 35 in the preferred embodiment constitutes the slip determining means, the fuel supply suppressing means and the retard control means according to the present invention.

Figure 2:
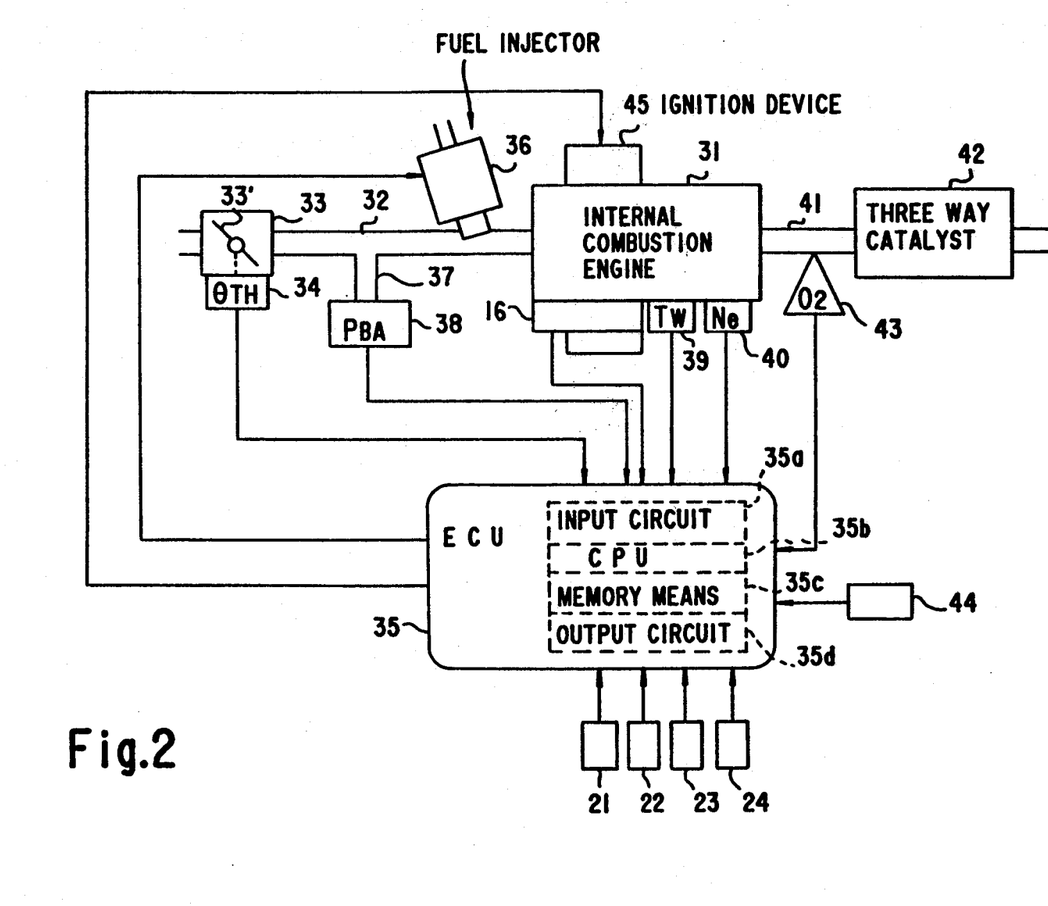
FIG. 2 is a schematic illustration of a fuel supply control device and an ignition timing control device for controlling an engine output according to the present invention.

FIG. 2 shows a general construction of the fuel supply control device and the ignition timing control device. The engine 31 is a 6-cylinder engine, for example. A suction pipe 32 is connected to the engine 31 on the upstream side thereof, and an exhaust pipe 41 is connected to the engine 31 on the downstream side thereof. A throttle body 33 including a throttle valve 33' is provided in the suction pipe 32, and a throttle valve opening ($\theta_{TH}$) sensor 34 is connected to the throttle valve 33' for converting a valve opening of the throttle valve 33' into an electrical signal and outputting the signal to the ECU 35.

In the suction pipe 32 between the engine 31 and the throttle body 33 is provided a fuel injector 36 for each cylinder at a position just upstream of each suction valve (not shown) in the cylinder. Each fuel injector 36 is connected to a fuel pump, and is also electrically connected to the ECU 35 so as to receive a signal from the ECU 35 for controlling a valve opening time of the fuel injector 36.

A suction pipe absolute pressure ($P_{BA}$) sensor 38 is connected through a pipe 37 to the suction pipe 32 downstream of the throttle body 33. An absolute pressure in the suction pipe as detected by the sensor 38 is converted into an electrical signal, and the signal is output to the ECU 35.

An ignition device 45 is connected to the engine 31. The ignition device 45 is electrically connected to the ECU 35 so as to receive a signal from the ECU 35 for controlling an ignition timing or the like of the ignition device 45.

An engine cooling water temperature sensor (which will be hereinafter referred to a $T_W$ sensor) 39 formed from a thermistor or the like is provided in a water jacket of the engine 31, and is electrically connected to the ECU 35 to output a detected water temperature signal to the ECU 35.

An engine speed sensor (which will be hereinafter referred to as a Ne sensor) 40 is provided around a camshaft or a crankshaft (both not shown) of the engine 31. The Ne sensor 40 generates a crank angle position signal pulse (which will be hereinafter referred to as a TDC signal pulse) at a predetermined crank angle position at every 120° rotation of the crankshaft of the engine 31, that is, at a crank angle position corresponding to a predetermined crank angle before a top dead center (TDC) at starting of a suction stroke in each cylinder. The TDC signal pulse is output to the ECU 35.

Another parameter sensor 44 for detecting a suction air temperature $T_A$, a gear ratio, etc. is connected to the ECU 35, and a detection signal from the parameter sensor 44 is output to the ECU 35.

The ECU 35 includes an input circuit 35a for shaping a waveform of the input signals from the above-mentioned various sensors, correcting a voltage level to a predetermined level, and converting an analogue signal to a digital signal, for example. The ECU 35 further includes a central processing unit (which will be hereinafter referred to as a CPU) 35b, a memory means 35c for storing various computing programs to be executed by the CPU 35b and also storing computing results executed by the CPU 35b, and an output circuit 35d for supplying a driving signal to the fuel injector 36.

The CPU 35b computes a fuel injection time $T_{OUT}$ of the fuel injectors 36 in accordance with the following equation (1) according to the engine parameter signals output from the above-mentioned sensors every time the TDC signal pulse is input to the CPU 35b.

$$T_{OUT} = T_i \times K_{STB} \times K_1 + K_2 \qquad (1)$$

Where, Ti stands for a basic fuel injection time to be read from a Ti map (not shown) stored in the memory means 35c according to the suction pipe absolute pressure $P_{BA}$ and the engine speed Ne; $K_{STB}$ stands for a slip control correction factor to be decided by a control program (which will be hereinafter described with reference to FIG. 4) according to a slip rate λ and a slip rate change quantity λ̇; and $K_1$ and $K_2$ stand for a correction factor and a correction variable to be computed according to the various engine parameter signals, respectively, which factor and variables are set to desired values so that various characteristics such as a fuel consumption characteristic and an acceleration characteristic may be made optimum.

The CPU 35b also computes an ignition timing $\theta_{IG}$ of the ignition device 45 in accordance with the following equation (2) according to the engine parameter signals from the above-mentioned sensors.

$$\theta_{IG} \times \theta_{IGM} - D_{IGTRC} \qquad (2)$$

Where, $\theta_{IGM}$ stands for a basic ignition timing to be read from a $\theta_{IGM}$ map (not shown) stored in the memory means 35c according to the suction pipe absolute pressure $P_{BA}$, the engine speed Ne, the engine cooling water temperature $T_W$, the suction air temperature $T_A$, etc.; and $D_{IGTRC}$ stands for a retard control variable for conducting slip control which variable is decided by a control program (which will be hereinafter described with reference to FIG. 5) according to the slip rate λ and the slip rate change quantity λ̇, for example.

The CPU 35b outputs a driving signal for opening the fuel injectors 36b outputs a driving signal for driving the ignition device 45 through the output circuit 35d to the fuel injectors 36 and the ignition device 45, respectively, according to the fuel injection time $T_{OUT}$ and the ignition timing $\theta_{IG}$ as computed above.

Figure 3:
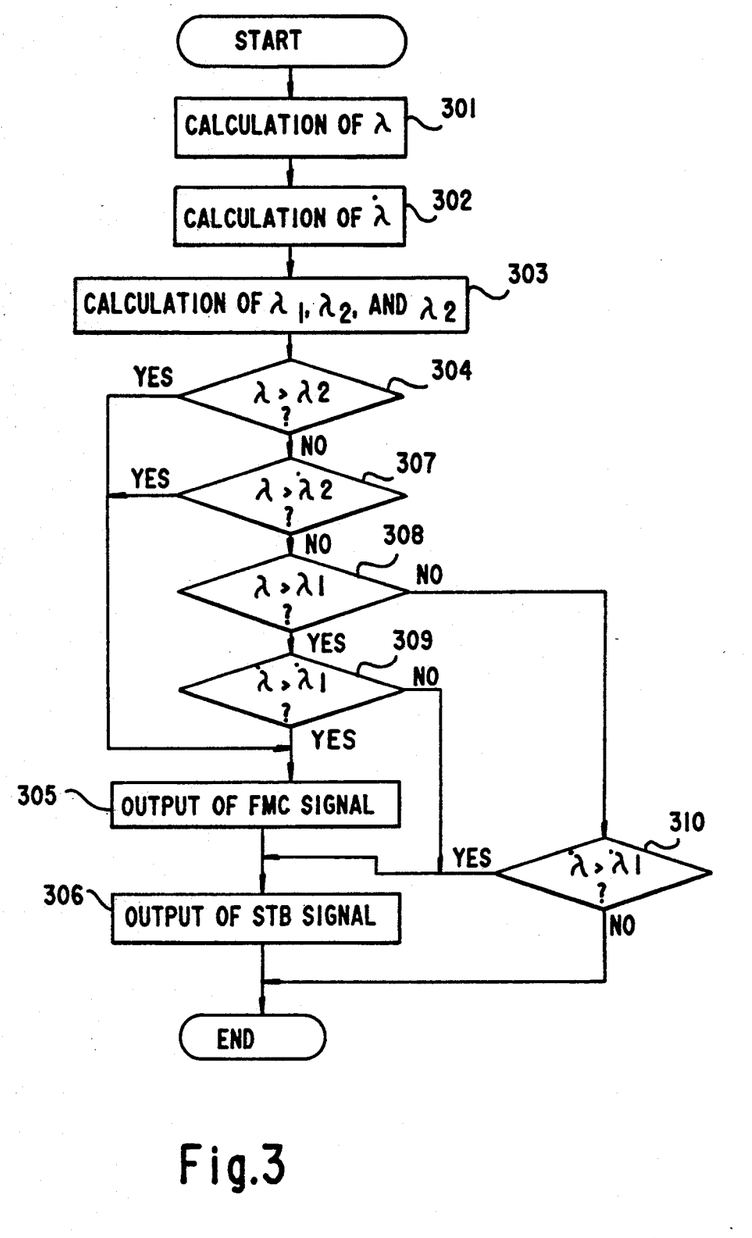
FIG. 3 is a flowchart of a sub routine for determining a slip condition of the driving wheel.

FIG. 3 shows a flowchart of a subroutine for determining the slip condition of the driving wheels 11 and 12 and outputting a control signal according to the result of determination. The program shown in FIG. 3 is executed every time the TDC signal pulse is generated.

In step 301, either of the left driving wheel speed $V_{WL}$ or the right driving wheel speed $V_{WR}$ is selected to set a driving wheel speed $V_W$, and either of the left driven wheel speed $V_L$ or the right driven wheel speed $V_R$ on the same side as of the selected driving wheel speed $V_{WL}$ or $V_{WR}$ is set to a vehicle speed V. Then, the slip rate λ is computed in accordance with the following equation (3) by using the driving wheel speed $V_W$ and the vehicle speed V as set above.

$$\lambda = \{(V_{WL} \text{ or } V_{WR}) - (V_L \text{ or } V_R)\}/V_{WL} \text{ or } V_{WR} \qquad (3)$$

Then, a change quantity (differential value) λ̇ of the slip rate λ is computed as a difference in the slip rate λ upon generation of a present TDC signal pulse and a previous TDC signal pulse (step 302).

Then, first and second thresholds $\lambda_1$ and $\lambda_2$ ($\lambda_1 < \lambda_2$) of the slip rate and first and second thresholds $\dot\lambda_1$ and $\dot\lambda_2$ ($\dot\lambda_1 < \dot\lambda_2$) of the slip rate change quantity are computed according to the gear ratio and the vehicle speed V, for example (step 303). The second threshold $\lambda_2$ of the slip rate is greater than the first threshold $\lambda_1$ of the slip rate, and the first threshold $\dot\lambda_2$ of the slip rate change quantity is greater than the first threshold $\dot\lambda_1$ of the slip rate change quantity. Further, both the first thresholds are set to values slightly lower than values generating an excess slip condition, and both the second thresholds are set to values larger than the values generating the excess slip condition.

Then, it is determined whether or not the slip rate $\lambda$ calculated above is greater than the second threshold $\lambda_2$ (step 304). If the answer is Yes in step 304, that is, if $\lambda > \lambda_2$ is valid, a fuel cut (FCM) signal is output in step 305, and a standby (STB) signal is output in step 306. Then, the program is ended.

If the answer is No in step 304, that is, if $\lambda \leq \lambda_2$ is valid, it is determined whether or not the slip rate change quantity $\dot\lambda$ is greater than the second threshold $\dot\lambda_2$ (step 307). If the answer is Yes in step 307, that is, if $\dot\lambda > \dot\lambda_2$ is valid, the steps 305 and 306 are executed, and the program is ended.

If the answer is No in step 307, that is, if $\dot\lambda \leq \dot\lambda_2$ is valid, it is determined whether or not the slip rate $\lambda$ is greater than the first threshold $\lambda_1$ (step 308). If the answer is Yes in step 308, it is determined whether or not the slip rate change quantity $\dot\lambda$ is greater than the first threshold $\dot\lambda_1$ (step 309). If the answer is Yes in step 309, that is, if $\lambda > \lambda_1$ and $\dot\lambda > \dot\lambda_1$ are valid, the steps 305 and 306 are executed, and the program is ended, while if the answer is No in step 309, that is, $\lambda > \lambda_1$ and $\dot\lambda \leq \dot\lambda_1$ are valid, the step 306 is executed, and the program is ended.

If the answer is No in step 308, the same processing as in step 309 is executed (step 310). If the answer is Yes in step 310, that is, $\lambda \leq \lambda_1$ and $\dot\lambda > \dot\lambda_1$ are valid, the step 306 is executed to end the program, while if the answer is No in step 310, that is, $\lambda \leq \lambda_1$ and $\dot\lambda \leq \dot\lambda_1$ are valid, the program is ended.

In summary, if one of the conditions of (i) $\lambda > \lambda_2$ (excess slip rate speed prevention), (ii) $\lambda > \lambda_1$ and $\dot\lambda > \dot\lambda_1$ (predictive control) and (iii) $\dot\lambda > \dot\lambda_2$ (excess slip rate prevention) is valid, the fuel cut signal is output (FIG. 6, (b), (1)). An operational region of the vehicle 1 where the fuel cut signal is on will be hereinafter referred to as a fuel cut region (FIG. 6, (c), (1)).

Further, if either of the condition of $\lambda > \lambda_1$ or $\dot\lambda > \dot\lambda_1$ is valid, the standby signal is output (FIG. 6, (b), (2)). An operational region of the vehicle 1 where the standby signal is on and the fuel cut signal is off will be hereinafter referred to as a standby region (FIG. 6, (c), (2)), while an operational region of the vehicle 1 other than the standby region and the fuel cut region will be hereinafter referred to as an off-standby region (FIG. 6, (c), (3)).

As is apparent from the valid condition ($\lambda > \lambda_1$ or $\dot\lambda > \dot\lambda_1$) of the standby region and the valid condition ($\lambda > \lambda_1$ and $\dot\lambda > \dot\lambda_1$, etc.) of the fuel cut region, the standby region corresponds to an operational region just before the transition from the off-standby region where the vehicle 1 is normally operated to the fuel cut region where the fuel supply is to be cut, or corresponds to an operational region just after the transition from the fuel cut region to the standby region (FIG. 6, (a), (c)).

Figure 4:
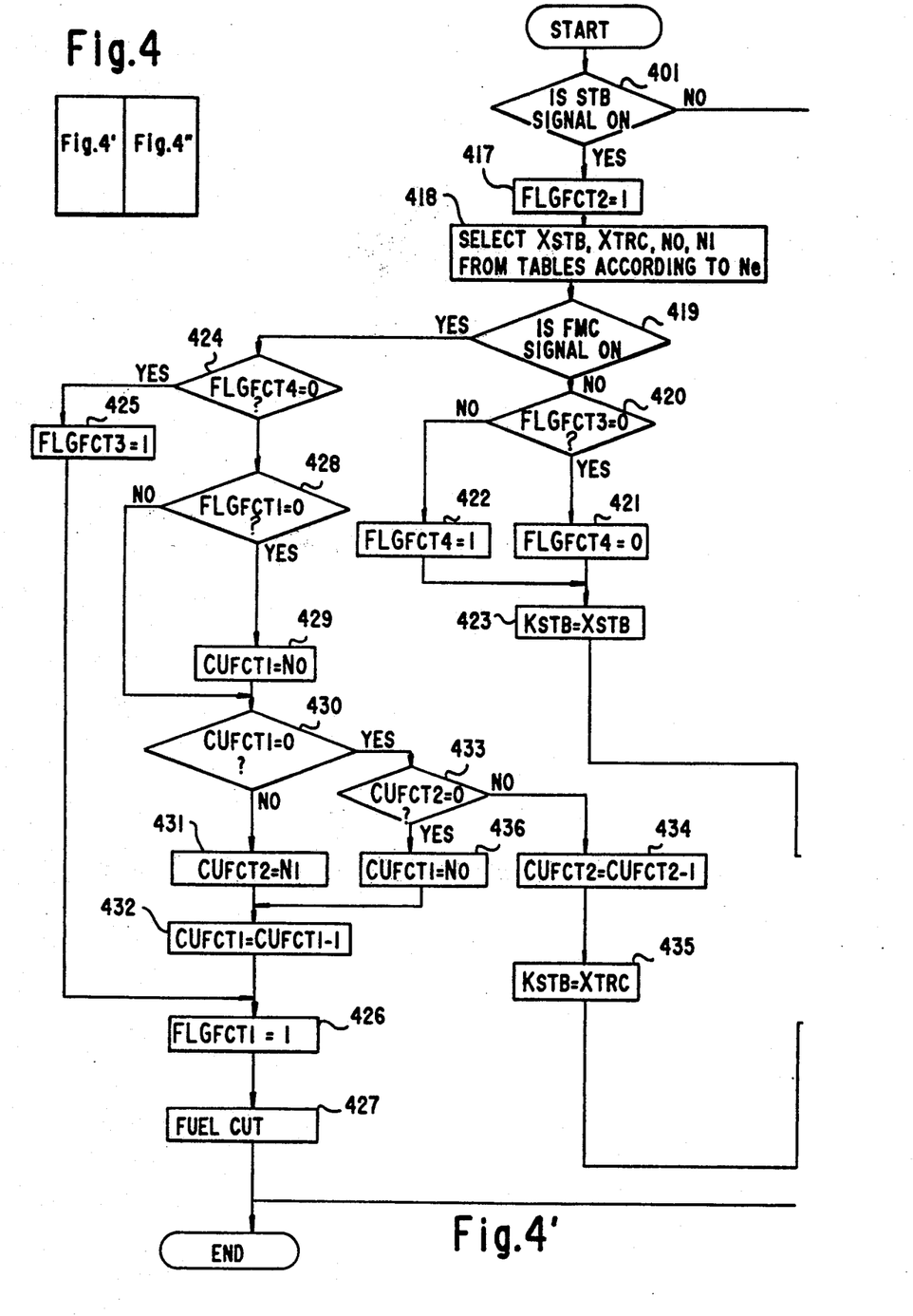
FIGS. 4, 4' and 4" are flowcharts of a fuel supply control program for executing the slip control shown in FIG. 3.

FIG. 4 shows a flowchart of a fuel supply control program for conducting slip control according to the generating condition of the fuel cut signal and the standby signal to be output by the execution of the sub routine shown in FIG. 3 and the other operational parameters. The fuel supply control program is executed every time the TDC signal pulse is generated.

In step 401, it is determined whether or not the standby signal is input. If the answer is No in step 401, that is, if the standby signal is not input, and accordingly the vehicle 1 is in the off-standby region, the program proceeds to step 402. Then, it is determined in step 402 whether or not a second flag $FLG_{FCT2}$ is equal to 0. When the vehicle 1 is in the standby region or the fuel cut region under the condition where the standby signal is on, the second flag $FLG_{FCT2}$ is set 1 in step 417 to be hereinafter described. On the other hand, when the vehicle 1 is in the off-standby region, the second flag $FLG_{FCT2}$ is set to 0 in step 414 to be hereinafter described.

If the answer is No in step 402, that is, if the second flag $FLG_{FCT2}$ is equal to 1, and accordingly the present loop is a loop at a timing just after transition to the off-standby region, the program proceeds to step 403. In step 403, a timer T.TRC such as a downcounter is set to a predetermined time $t_{TRC}$ (2.0 seconds, for example), and it is started.

Figure 6A:
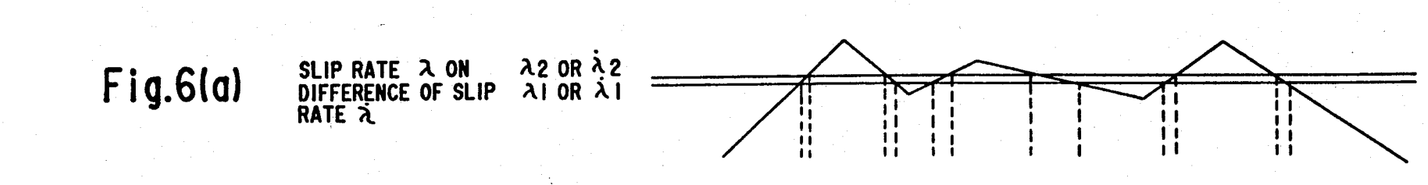
FIGS. 6(a)–6(d) are diagrams illustrating the relation between a slip rate or a slip rate change quantity and the slip control.
Figure 6B:
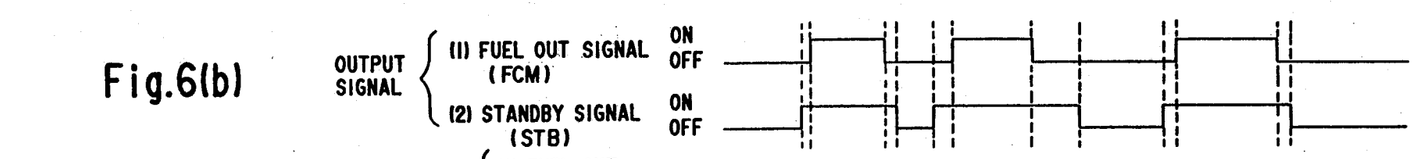
Figure 6C:
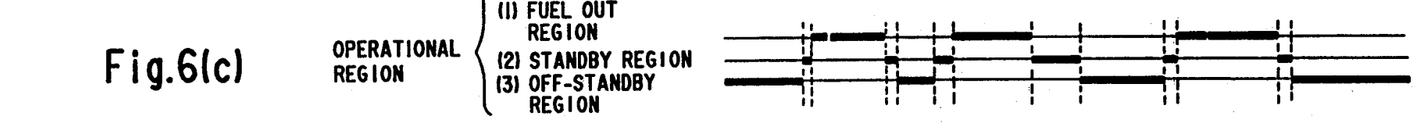
Figure 6D:
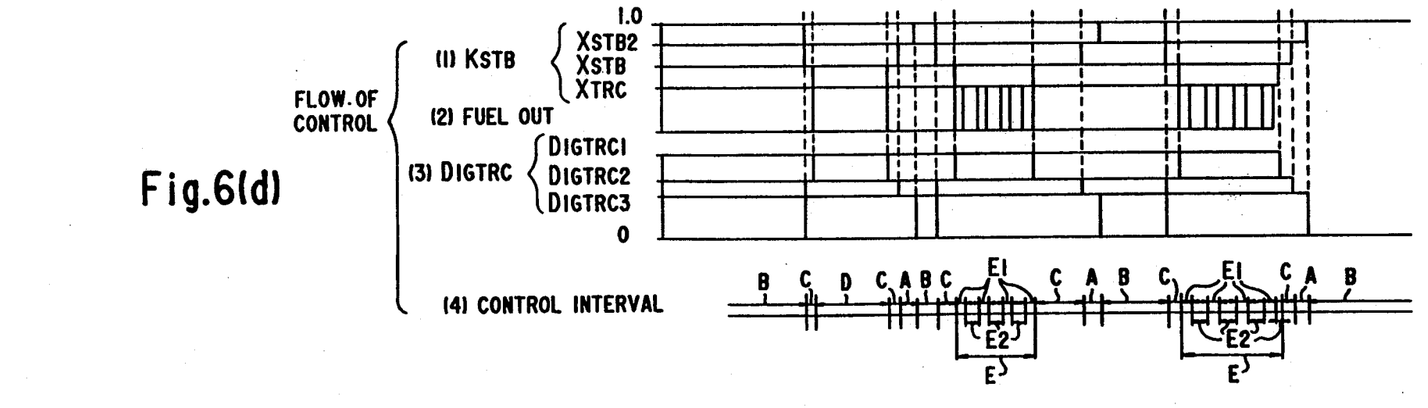

Then, the program proceeds to step 404, and a third control variable $CU_{FCT3}$ is set to a third predetermined frequency $N_2$ (2, for example). Then, in step 405, the slip control correction factor $K_{STB}$ is set to a lean predetermined value $X_{STB2}$ (0.8, for example) for the off-standby region (FIG. 6, (d), (4), interval A).

If the answer is Yes in step 402, that is, if the second flag $FLG_{FCT2}$ is equal to 0, and accordingly both the previous loop and the present loop exist in the off-standby region, the program proceeds to step 407. In step 407, it is determined whether or not the third control variable $CU_{FCT3}$ is equal to 0.

If the answer is No in step 407, that is, if the third control variable is not equal to 0, 1 is subtracted from the third control variable to set a new third control variable in step 408. Then, the step 405 is executed, and the program proceeds to step 409. If the answer is Yes in step 407, that is, if the third control variable $CU_{FCT3}$ is equal to 0, the slip control correction factor $K_{STB}$ is set to 1.0 in step 406 (FIG. 6, (d), (4), interval B), and the program proceeds to step 409.

As mentioned above, by the TDC frequency equal to the third predetermined frequency plus 1 just after the vehicle is shifted to the off-standby region, the slip control correction factor $K_{STB}$ is set to a value smaller than a normal value after the above TDC frequency (FIG. 6, (d), (1)). Accordingly, a fuel mixture to be supplied to the engine 31 is made lean at the initial stage of cancellation of fuel cut to thereby reduce an output of the engine 31 as compared with a normal output in the off-standby region. Therefore, shock due to rapid recovery of the driving torque can be prevented.

In step 409, it is determined whether or not a count value T.TRC of the timer T.TRC as set in step 403 is equal to 0. If the answer is No in step 409, that is, if the count value T.TRC is not equal to 0, and accordingly the predetermined time $t_{TRC}$ is not elapsed after the vehicle is shifted to the off-standby region, a third flag $FLG_{FCT3}$ and a fourth flag $FLG_{FCT4}$ are set to 1 in step 410 and step 411, respectively, and the program proceeds to step 411. If the answer is Yes in step 409, that is, if the timer value T.TRC is equal to 0, and accordingly the predetermined time $t_{TRC}$ is elapsed after the vehicle is shifted to the off-standby region, the third flag $FLG_{FCT3}$ and the fourth flag $FLG_{FCT4}$ are set to 0 in step 412 and step 413, respectively, and the program proceeds to step 414.

In step 414, the second flag $FLG_{FCT2}$ is set to 0. Then, in step 415, a first flag $FLG_{FCT1}$ is set to 0, and the program proceeds to step 416. In step 416, the slip control correction factor $K_{STB}$ as set in step 405 or step 406 is applied to the aforementioned equation (1) to calculate the fuel injection time $T_{OUT}$ and perform the fuel injection in accordance with the fuel injection time $T_{OUT}$ as calculated. Then, the program is ended.

On the other hand, if the answer is Yes in step 401, that is, if the standby signal is on, and accordingly the vehicle is in either of the standby region or the fuel cut region, the program proceeds to step 417, and the second flag $FLG_{FCT2}$ is set to 1 in step 417.

Then, the program proceeds to step 418, and a predetermined value $X_{STB}$ for the standby region, a predetermined value $X_{TRC}$ for the fuel cut region and first and second predetermined frequencies $N_0$ and $N_1$ are selected from a $X_{STB}$ table, $X_{TRC}$ table, $N_0$ table and $N_1$ table (all not shown) stored in the memory means 35c, respectively, according to the engine speed Ne.

The predetermined value $X_{STB}$ for the standby region is set to a value less than 1.0, and the predetermined value $X_{TRC}$ for the fuel cut region is set to a value less than the predetermined value $X_{STB}$ if the engine speed Ne is identical.

Then, the program proceeds to step 419, and it is determined whether or not the fuel cut signal is on. If the answer is No in step 419, that is, if the fuel cut signal is not input, and accordingly the vehicle is in the standby region, the program proceeds to step 420. In step 420, it is determined whether or not the third flag $FLG_{FCT3}$ is equal to 0. If the answer is Yes in step 420, that is, if the third flag $FLG_{FCT3}$ is equal to 0, the fourth flag $FLG_{FCT4}$ is set to 0 in step 421, while if the answer is No in step 420, that is, if the third flag $FLG_{FCT3}$ is equal to 1, the fourth flag $FLG_{FCT4}$ is set to 1 in step 422.

Then, the program proceeds to step 423, and the slip control correction factor $K_{STB}$ is set to the predetermined value $X_{STB}$ for the standby region as set in step 418 (FIG. 6, (d), (4), interval C). In the transition state between the off-standby region as a normal operational condition and the fuel cut region where the fuel supply is to be cut, an air-fuel ratio of the fuel mixture to be supplied to the engine 31 tends to be fluctuated to cause unstable combustion characteristic of the engine 31. Further, the combustion characteristic of the engine 31 is dependent on the engine speed Ne. In a low speed operational region of the engine 31, resonance in a suspension system of a vehicle body is generated to reduce the drivability. Accordingly, by setting the slip control correction factor to the predetermined value $X_{STB}$ for the standby region as set according to the engine speed Ne, the drivability can be improved in the overall range of the engine speed.

Then, the steps 415 and 416 are executed, and the slip control correction factor $K_{STB}$ set in step 423 is applied to the aforementioned equation (1) to perform the fuel injection. Then, the program is ended.

If the answer is Yes in step 419, that is, if the fuel cut signal is on, and accordingly the vehicle is in the fuel cut region, the program proceeds to step 424. In step 424, it is determined whether or not the fourth flag $FLG_{FCT4}$ is equal to 0. If the answer is Yes in step 424, the third flag $FLG_{FCT3}$ is set to 1 in step 425, and then the first flag $FLG_{FCT1}$ is set to 1 in step 426. Then, the program proceeds to step 427 to execute the fuel cut (FIG. 6, (d), (4), interval D), thereafter ending the program.

As is apparent from the steps 409 and 413, for example, when the timer value T.TRC of the timer T.TRC is 0, the fourth flag $FLG_{FCT4}$ is set to 0. In other words, when the vehicle is shifted to the fuel cut region after it stays in the off-standby region for a period of time not less than the predetermined time $t_{TRC}$, the answer in step 424 is Yes to continue the fuel cut. That is, when the vehicle is shifted to the fuel cut region after a long period of time of the off-standby region, it is estimated that the slip condition is an excess slip condition at acceleration from a slip rate of 0 or nearly 0, and it is predicted that a change width and a change speed of the slip rate λ become large. Accordingly, by continuing the fuel cut in this case, the driving force of the engine 31 can be reliably reduced to quickly converge the slip rate λ to a desired value.

If the answer is No in step 424, that is, if the fourth flag $FLG_{FCT4}$ is equal to 1, the program proceeds to step 428 to determine whether or not the first flag $FLG_{FCT1}$ is equal to 0. As is apparent from the steps 415 and 426, the first flag $FLG_{FCT1}$ is set to 1 in executing the fuel cut in the fuel cut region, while it is set to 0 in the other regions.

If the answer is Yes in step 428, that is, if the first flag $FLG_{FCT1}$ is equal to 0, and accordingly the present loop is a loop just after transition to the fuel cut region, the program proceeds to step 429. In step 429, the first control variable $CU_{FCT1}$ is set to the first predetermined frequency $N_0$ selected in step 418, and then the program proceeds to step 430.

If the answer is No in step 428, that is, if the first flag $FLG_{FCT1}$ is equal to 1, and accordingly the present loop is a second or subsequent loop after transition to the fuel cut region, the program proceeds to step 430.

In step 430, it is determined whether or not the first control variable $CU_{FCT1}$ is equal to 1. If the answer is No in step 430, that is, if the first control variable $CU_{FCT1}$ is not 0, the program proceeds to step 431, and the second control variable $CU_{FCT2}$ is set to the second predetermined frequency $N_1$ selected in step 418. Then in step 432, 1 is subtracted from the first control variable $CU_{FCT1}$, and the steps 426 and 427 are executed to perform the fuel cut (FIG. 6, (d), (4), interval $E_1$). Then, the program is ended.

If the answer is Yes in step 430, that is, if the first control value $CU_{FCT1}$ is equal to 0, the program proceeds to 433 to determined whether or not the second control variable $CU_{FCT2}$ is equal to 0. If the answer is No in step 433, that is, if the second control variable $CU_{FCT2}$ is not 0, the program proceeds to 434 to subtract 1 from the second control variable $CU_{FCT2}$. Then in step 435, the slip control correction factor $K_{STB}$ is set to the predetermined value $X_{TRC}$ for the fuel cut region selected in step 418 (FIG. 6, (d), (4), interval $E_2$). Then, the step 416 is executed to apply the correction factor $K_{STB}$ as set above to the aforementioned equation (1) and perform the fuel injection. Then, the program is ended.

If the answer is Yes in step 433, that is, if the second control variable $CU_{FCT2}$ is equal to 0, the program proceeds to step 436 wherein the first control variable $CU_{FCT1}$ is set to the first predetermined frequency $N_0$ in the same manner as in step 429. Then, the steps 432, 426 and 427 are executed to perform the fuel cut. Then, the program is ended.

As mentioned above, if the fourth flag $FLG_{FCT4}$ is equal to 1 regardless of the condition that the vehicle is in the fuel cut region, the fuel cut is not continued but the execution of the fuel cut by the TDC frequency equal to the first predetermined frequency $N_0$ and the cancellation of the fuel cut by the TDC frequency equal to the second predetermined frequency $N_1$ are alternately repeated (FIG. 6, (d), (4), internal E). As is apparent from the steps 409 and 411, the fourth flag FLG$_{FCT4}$ is set to 1 when the retention time of the off-standby region before transition to the fuel cut region is less than the predetermined time t$_{TRC}$. Alternatively, as is apparent from the steps 425, 420 and 422, the fourth flag FLG$_{FCT4}$ is also set to 1 when the vehicle is shifted from the fuel cut region to the standby region, and is then returned to the fuel cut region rather than shifted to the off-standby region. In other words, the fourth flag FLG$_{FCT4}$ is set to 1 when the slip control is performed in a relatively short period of time. In this case, since the change width and the change speed of the slip rate λ is small, the repetition of the execution and the cancellation of the fuel cut by the respective predetermined TDC frequencies can prevent an operational shock due to rapid decrease in the driving torque of the engine 31 to thereby improve the drivability.

Figure 5:
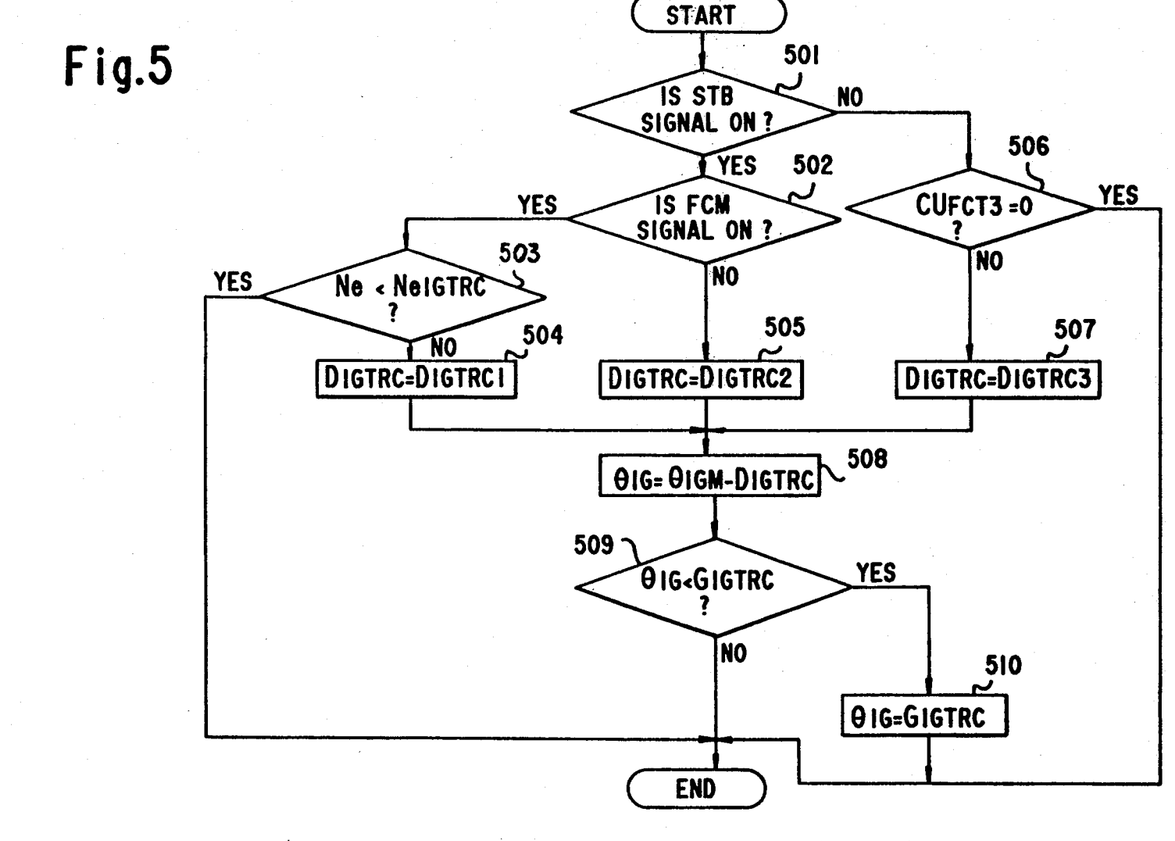
FIG. 5 is a flowchart of an ignition timing control program for executing the slip control.

FIG. 5 shows a flowchart of an ignition timing control program for conducting slip control according to the generating condition of the fuel cut signal and the standby signal and any other operational parameters. This program is executed every time the TDC signal pulse is generated.

First, it is determined whether or not the standby signal is on (step 501). If the answer is Yes in step 501, it is determined whether or not the fuel cut signal is on (step 502). If the answer is Yes in step 502, that is, if the vehicle 1 is in the fuel cut region, it is determined whether or not the engine speed Ne is smaller than a predetermined value Ne$_{IGTRC}$ (1800 rpm, for example) (step 503). If the answer is No in step 503, that is, if Ne≧Ne$_{IGTRC}$ is valid, the retard control variable D$_{IGTRC}$ is set to a first predetermined value D$_{IGTRC1}$ (10°, for example) (step 504), and the program proceeds to step 508. On the other hand, if the answer is Yes in step 503, that is, if Ne<Ne$_{IGTRC}$ is valid, the program is ended. Thus, when the engine 31 is in a low speed operational condition, the retard control variable D$_{IGTRC}$ is not set, that is, the retard control of the ignition timing is not conducted though the vehicle 1 is in the fuel cut region, so as to prevent engine stall due to a reduction in engine output at a low engine speed.

If the answer is No in step 502, that is, if the vehicle 1 is in the standby region, the retard control variable D$_{IGTRC}$ is set to a second predetermined value D$_{IGTRC2}$ (7°, for example) smaller than the first predetermined value D$_{IGTRC}$ (step 505), and the program proceeds to step 508.

If the answer is No in step 501, that is, if the vehicle 1 is in the off-standby region, it is determined whether or not the third control variable CU$_{FCT3}$ to be set and subtracted in the control program shown in FIG. 4 is equal to 0 (step 506). If the answer is No in step 506, that is, if the vehicle 1 has just been shifted to the off-standby region, the retard control variable D$_{IGTRC}$ is set to a third predetermined value D$_{IGTRC3}$ (5°, for example) smaller than the second predetermined value D$_{IGTRC2}$ (step 507), and the program proceeds to step 508. On the other hand, if the answer is Yes in step 506, the program is ended. Steps 501, 502, and 503, as implemented in a CPU, together can be considered to constitute a retard control value determination means. Step 506, as implemented in a CPU, can be considered to constitute a retard control continuing means.

In step 508, the ignition timing θ$_{IG}$ is calculated in accordance with the aforementioned equation (2) by using the retard control variable D$_{IGTRC}$ as set in step 504, 505 or 507.

Then, it is determined whether or not the ignition timing θ$_{IG}$ calculated above is smaller than a guard value G$_{IGTRC}$ (2°, for example) (step 509). If the answer is Yes in step 509, the ignition timing θ$_{IG}$ is set to the guard value G$_{IGTRC}$ (step 510), and the program is ended. On the other hand, if the answer is No in step 509, the program is ended.

In summary, the retard control variable D$_{IGTRC}$ is set to the first predetermined value D$_{IGTRC1}$ when the vehicle 1 is in the fuel cut region and the engine 31 is in a high speed operational condition. When the vehicle 1 is in the standby region, the retard control variable D$_{IGTRC}$ is set to the second predetermined value D$_{IGTRC2}$. When the vehicle 1 is in the off-standby region which has just been shifted, the retard control variable D$_{IGTRC}$ is set to the third predetermined value D$_{IGTRC3}$. The retard control variable D$_{IGTRC}$ is set to 0 in the other operational regions. (FIG. 6, (d), (3)) As will be apparent from FIG. 6, the higher a degree of slip, the more a fuel supply quantity is reduced, and the more retard position the ignition timing θ$_{IG}$ is set to. Accordingly, the engine output is more reduced. The control of the ignition timing θ$_{IG}$ as well as the control of fuel supply upon detection of excess slip contributes to reduction control of the engine output. Therefore, control response in both a suction stroke and a compression stroke is improved by the fuel supply control and the ignition timing control as compared with that by the fuel supply control only. Furthermore, as the engine output is more reduced in the standby region, a fluctuation in engine torque to be generated at transition from the standby region to the fuel cut region and vice versa may be reduced to suppress the operational shock, thereby improving the drivability.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

We claim:

1. An excess slip control device for controlling an output torque of a driving wheel, which is driven by an engine, by reducing an output of the engine during an excess slip condition of the driving wheel, comprising:
    driving wheel speed sensor for detecting a driving wheel speed of said driving wheel of said vehicle;
    a slip determining means for determining a slip condition of said driving wheel based on an output of said driving wheel speed sensor;
    a fuel supply suppressing means including fuel decreasing and fuel cutting means for suppressing fuel supply to engine in response to said slip condition detected by said slip determining means; and
    a retard control means for controlling an ignition timing of said engine to a retard position in response to said slip condition detected by said slip determining means, said retard position being determined in accordance with the suppressing degree of fuel suppressing control; whereby said fuel supply suppressing means and said retard control means control excess slip of said driving wheel by reducing power supplied by said engine to said driving wheel.

2. An excess slip control device as claimed in claim 1, wherein said slip determining means includes a first comparator means for comparing at least one of a slip rate and a slip rate change quantity with a first predetermined value, and wherein said fuel supply suppressing means causes leaning of an air fuel ratio in response to an output signal from said first comparator means indicating detection of said slip condition in which said at least one of said slip rate and said slip rate change quantity exceeds said first predetermined value and said retard control means causes retarding of the ignition timing to a first predetermined angle in response to said output signal from said first comparator means indicating detection of said slip condition in which said at least one of said slip rate and said slip rate change quantity exceeds said first predetermined value.

3. An excess slip control device of claim 2, wherein said slip determining means further includes a second comparator means for comparing at least one of said slip rate and said slip rate change quantity with a second predetermined value which is larger than said first predetermined value, and wherein said fuel supply suppressing means causes leaning of said air fuel ratio and performs fuel cutting in response to an output signal from said second comparator means indicating detection of said slip condition in which said at least one of said slip rate and said slip rate change quantity exceeds said second predetermined value and said retard control means causes retarding of the ignition timing to a second predetermined angle in response to the output signal from said second comparator means indicating detection of said slip condition in which said at least one of said slip rate and said slip rate change quantity exceeds said second predetermined value.

4. An excess slip control device as claimed in claim 1, wherein said fuel supply suppressing means and said retard control means respectively maintain suppressing of said fuel supply and controlling of the ignition timing to said retard position during a predetermined time period starting from a time when said slip determining means first detects a normal slip condition after previous detection of said excess slip condition.

5. An excess slip control device of claim 1, wherein said retard control means further comprises retard control value determination means for determining the retard control value in accordance with one of (a) the slip condition of the driving wheel and (b) the engine operating condition.

6. An excess slip control device of claim 5, wherein said retard control means further comprises retard control continuing means for continuing the retard control for a predetermined period after cessation of the slip condition of the driving wheel.

* * * * *